May 29, 1934.  P. S. SHIELD  1,960,515
SELECTOR
Filed March 10, 1931    3 Sheets-Sheet 1

INVENTOR
Paul S. Shield
BY
ATTORNEY

May 29, 1934.  P. S. SHIELD  1,960,515
SELECTOR
Filed March 10, 1931  3 Sheets-Sheet 2

INVENTOR
Paul S. Shield
BY
ATTORNEY

May 29, 1934.    P. S. SHIELD    1,960,515
SELECTOR
Filed March 10, 1931    3 Sheets-Sheet 3

Paul S. Shield INVENTOR
BY
ATTORNEY

Patented May 29, 1934

1,960,515

UNITED STATES PATENT OFFICE 1,960,515

SELECTOR

Paul S. Shield, Cincinnati, Ohio, assignor to Augustine Davis, Jr., Cincinnati, Ohio Application March 10, 1931, Serial No. 521,426

15 Claims. (Cl. 251—107)

The invention relates to selectors for fluid systems having multiple branches, and more particularly for hydraulic systems for operating any one of a number of hydraulically actuated devices to the exclusion of the others. The herein described selector is more especially intended for installation in a closed hydraulic system for operating valves.

Among the objects of the invention is the provision of a selector which is compact and simple in construction, non-leaking, convenient to operate, durable, and reliable. Another object is to cause the selector to be automatically and completely locked at each port registering position as the result of pressure on the fluid, and to accomplish this in a simple and effective manner. A further object is to provide for easy unlocking of the rotor when the fluid pressure is relieved. Still another object is to insure accurate registration of ports at each and every position of the rotor of the selector. Other objects and features of the invention will be apparent from the drawings and the description of the preferred embodiment of the invention.

Figure 1:
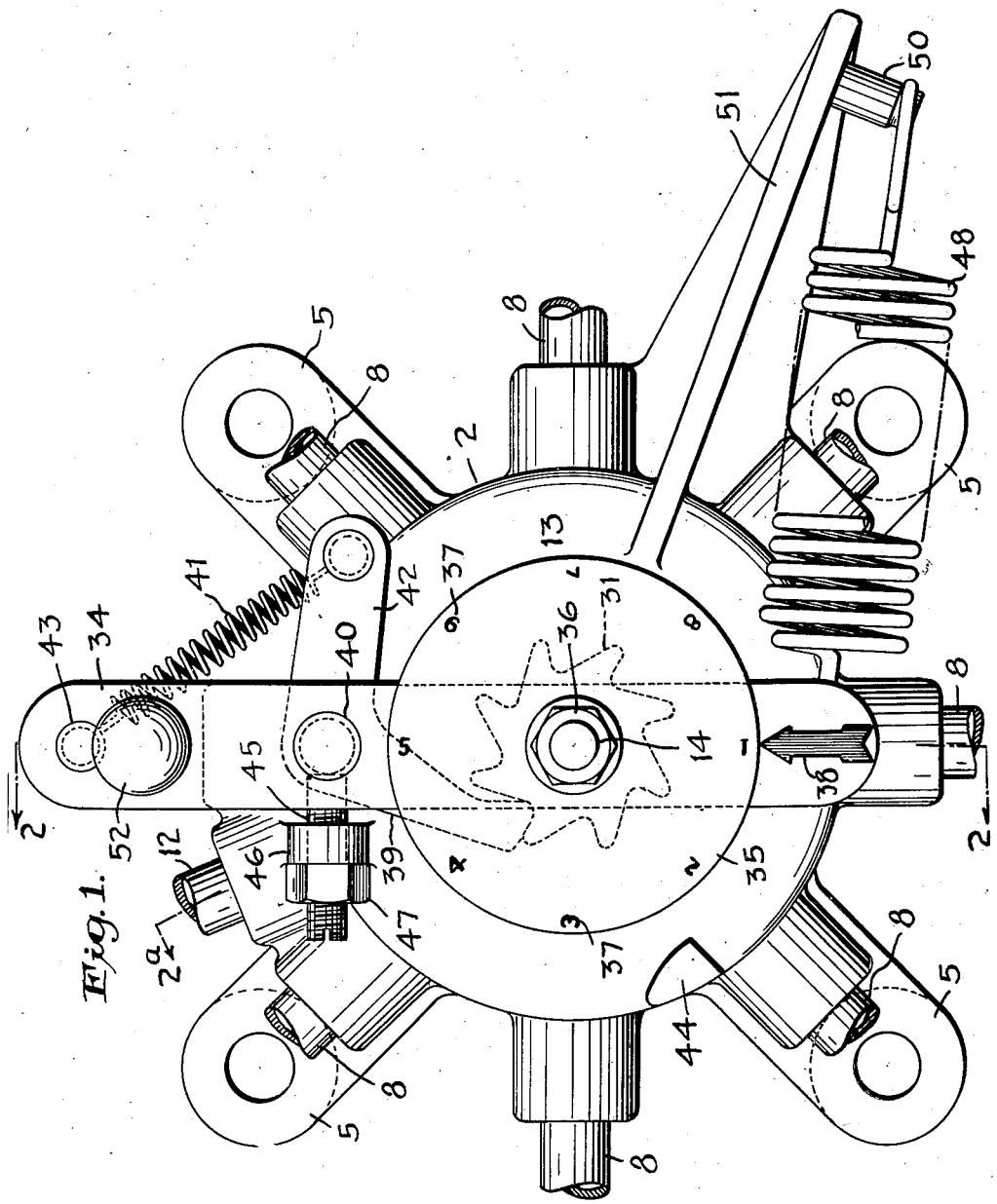
Figure 2:
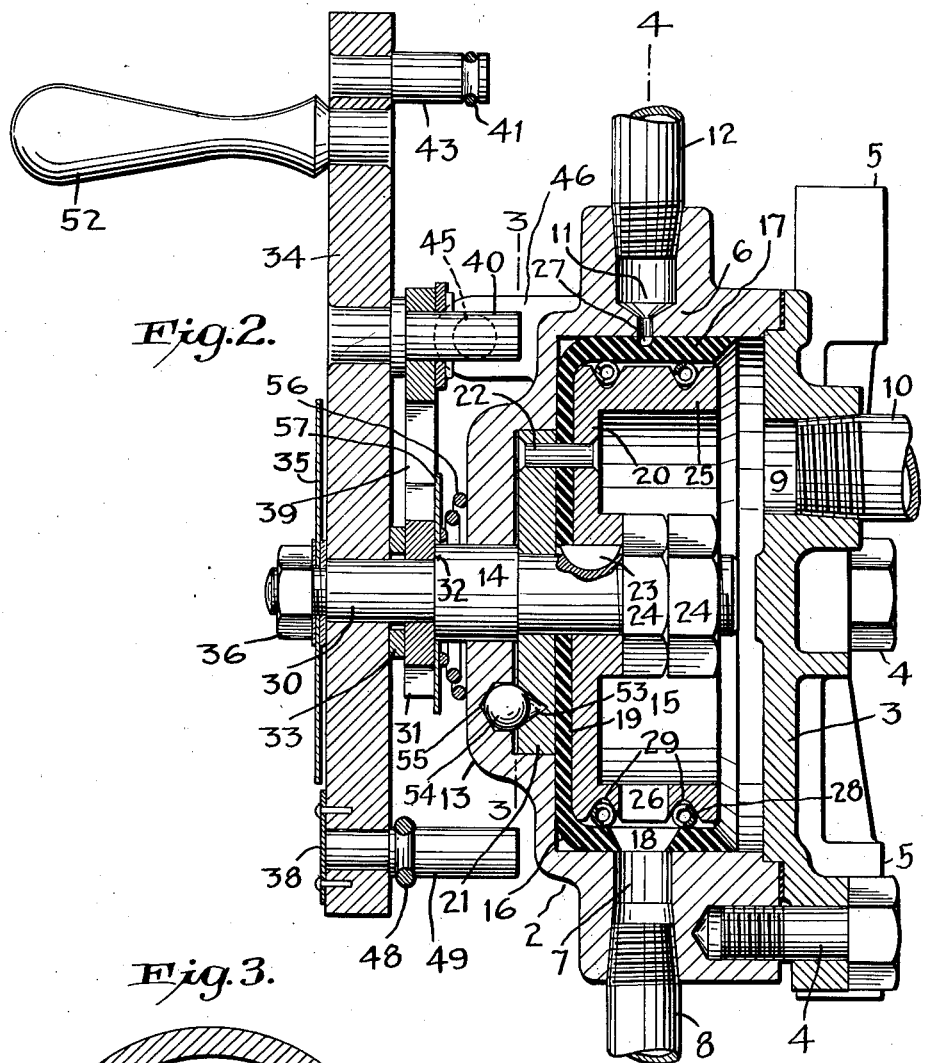
Figure 3:
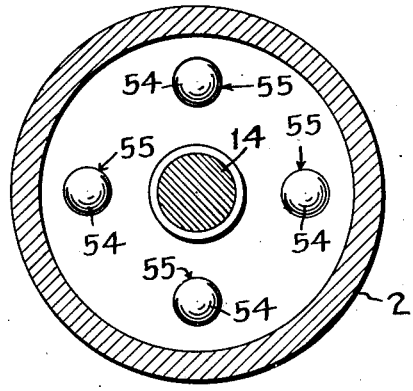
Figure 4:
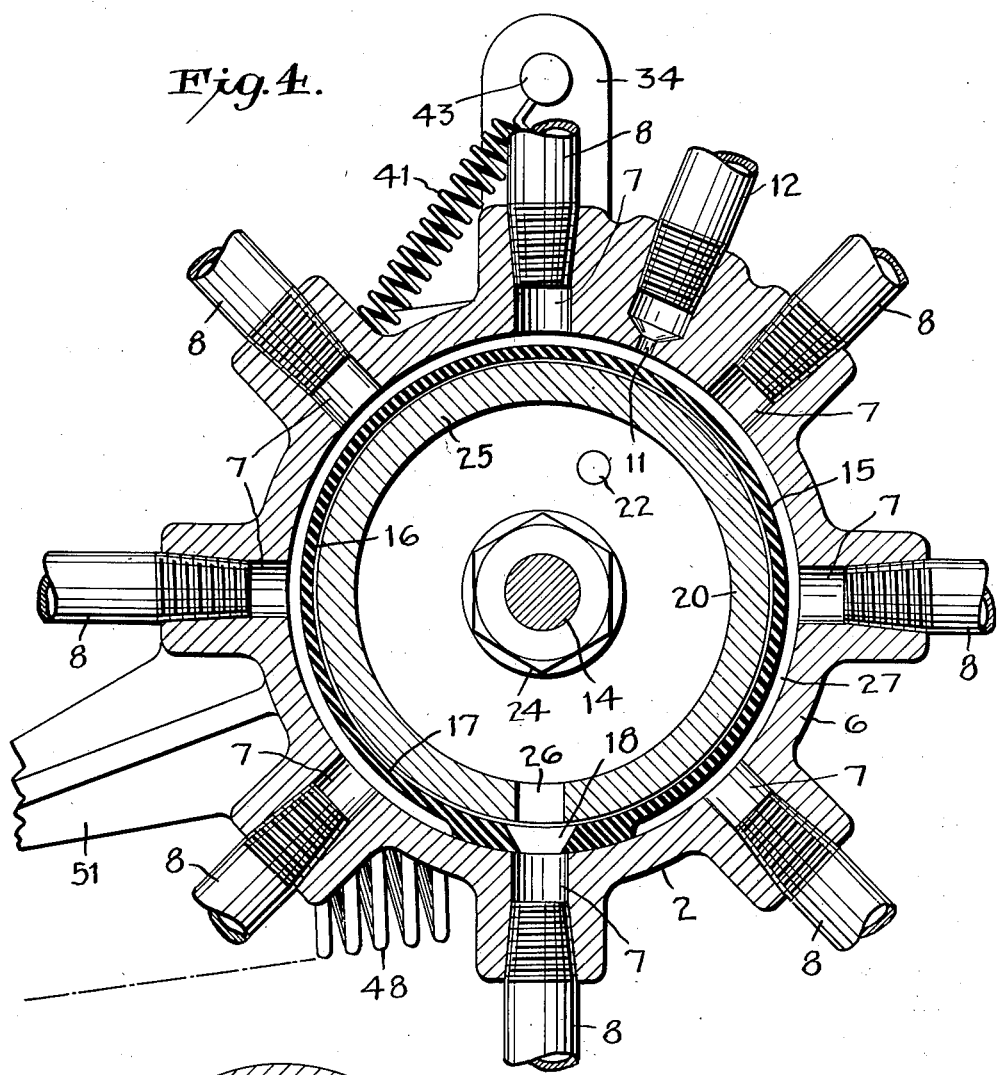
Figure 5:
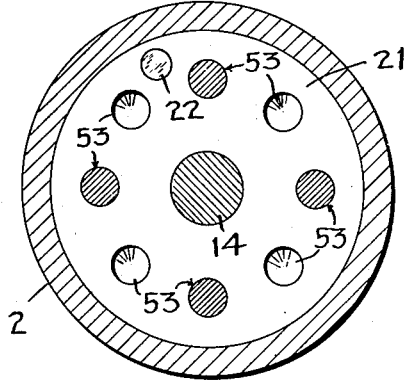

In the accompanying drawings, forming part hereof:

Fig. 1 is a plan view of the selector;
Fig. 2 is a section on the line 2—2 of Fig. 1;
Fig. 3 is a section on the line 3—3 of Fig. 2;
Fig. 4 is a section on the line 4—4 of Fig. 2; and
Fig. 5 is a section on the line 3—3 of Fig. 2, looking in the reverse direction to that of Fig. 3.

The selector has a circular casing 2, one side of which may be closed by a plate 3 secured by screws 4. This plate is shown provided with apertured feet 5 by means of which the casing can be fixed to a support. The casing may be installed with its axis either vertical or horizontal, or in any other position.

The peripheral wall 6 of the casing has a series of equidistant ports 7, with which pipes 8 are connected. The plate 3 is shown provided with an opening 9, having a pipe 10 connected to it. Since the selector is intended for use more especially with a hydraulic valve operating system, it will be described with reference to such a system, for a further understanding of which reference may be had to my copending application, Serial No. 513,560, filed February 5, 1931. The pipes 8 may, therefore, be understood as leading to the expansible chambers or bellows devices constituting servo-motors for opening a plurality of valves, and the pipe 10 may be understood as being connected with a piston and cylinder operator such, for example, as that disclosed in my said copending application. In such a system, the expansible chamber of the operator, the expansible chambers of the servo-motors and all connecting pipes and passages are constantly full of oil or other liquid. The interior of the selector, which is interposed between the operator and the piping leading to the valves, is therefore also constantly full. Pressure applied to the liquid by the operator will displace the liquid in the direction to open any one of the valves, depending on the position of the selector, and when the piston of the operator is returned there is an equal displacement in the reverse direction, permitting the opened valve to close.

The peripheral wall of the casing has an extra orifice 11 from which a pipe 12 leads back to the reservoir of the operator or to any receptacle for surplus liquid which may be forced out of the valve lines as the result of heat expansion.

The head wall 13 of the casing has a central opening through which there passes a rotatable shaft 14, this shaft being capable of moving endwise in the head. Fixed to the shaft inside the casing is a ported rotor 15. An important feature is the application in this rotor of a cup-leather 16, the skirt 17 of which cooperates in a fluid-tight manner with the inside of the peripheral wall 6 except as communication is established, by a port 18 through the skirt, between the interior of the casing and any one of the peripheral ports 7. The back 19 of this cup-leather preferably bears in a fluid-tight manner against the inner surface of the head-wall 13. No stuffing-box for the shaft 14 is required.

The back of the cup-leather is clamped between a cupped body 20 inside the cup-leather and a plate 21 on the opposite side. These parts are connected together in proper angular relation with reference to the axis by a pin 22. The rotor assembly is connected to the shaft 14, in proper angular relation, by a key 23, and is held against a shoulder of the shaft by nuts 24 on the inner end of the shaft.

The annular part 25 of the body 20, which extends inside the skirt of the cup-leather, is provided with a port 26, in the same position as the port 18. When the port 26, 18 registers with any one of the peripheral ports 7 pressure can be transmitted from the selector through the particular line 8 to open the selected valve, and when the pressure is relieved by rearward movement of the piston of the operator (not shown), there is a movement of liquid from the line 8 into and through the selector, permitting the valve to close.

A circumferential groove 27 may be provided in the outside of the skirt of the cup-leather to relieve any fluid pressure due to heat expansion on liquid in the servo-motors of all valves not in communication with the rotor port 26, 18. Such groove terminates at opposite sides of the port 18, so that it is not in communication with this port or with the particular port 7 with which the rotor port registers at any one time. It communicates, however, with all other of the ports 7 and with the extra port 11, so that any extra liquid in the lines and servo-motors which are closed off from the interior of the selector can pass into the pipe 12, from which it will return when the liquid contracts.

The periphery of the body 20 is not in contact with the skirt 17 of the cup-leather, but the latter is internally supported and pressed outward against the circular inside wall of the casing by springs 28 interposed between said skirt and the rotor body. A very effective construction for this purpose is one which utilizes helical springs which are disposed circularly in grooves 29 cut in the periphery of the rotor body at opposite sides of the zone of ports. These springs are of such length that, when they are curved in a circle with the two ends of each spring abutting each other, the springs will exert a circumferentially uniform outward pressure against the skirt of the cup-leather, holding the same firmly against the surrounding surface in the casing. When the operating fluid is under pressure to open and keep open one of the valves, the fluid pressure will hold the cup-leather tight against the casing. At such time the springs act as an auxiliary pressure means which is not necessarily important as far as this phase of the operation is concerned, but when the piston of the operator is moved back, to cause the closing of the valve then open, the cup-leather might be drawn away from the casing, and the outward pressure of the springs is then desirable. The springs insure against leakage of oil from the selector when all valves are closed and the liquid is not under pressure.

On a reduced outer portion 30 of the shaft 14 there is fixed a ratchet-wheel 31, this ratchet-wheel being preferably located against a shoulder 32 of the shaft. Beyond the ratchet-wheel, and spaced therefrom by a washer 33, an operating lever 34 is mounted loosely on the shaft, so as to be capable of turning relatively to the shaft.

An indicator disc 35 is clamped against a shoulder near the outer end of the shaft by a nut 36, washers being preferably interposed between the lever 34 and this disc, and between the disc and the nut. The indicator disc is accordingly fixed to the shaft, whereas the lever 34, in its idle movement, turns relatively to the shaft and disc.

In the illustrated embodiment of the invention, the selector is provided with eight ports 7, enabling the selector to be used with any number of valves up to eight. It will be understood that any ports not used, because of the particular installation having a less number of valves, will be closed by plugs. The disc or dial 35 bears digit numerals 37 corresponding to the number of ports 7, these numerals being equally spaced and being positioned in a manner to correspond with the several port-registering positions of the rotor. In this instance the dial numerals run from 1 to 8. To cooperate with these numerals, the lever 34 is provided with any suitable index mark or formation 38. Such index may be simply a portion of the lever.

On the under or inner side of the lever 34 there is a pawl 39, which is pivotally connected to the lever by being swung on a pin 40. This pawl coacts with the ratchet-wheel 31 and is urged into engagement therewith by a spring 41 connecting the tail 42 of the pawl with another pin 43 projecting from the lever.

The operating lever 34 is limited to an angular movement slightly greater than that corresponding to one tooth of the ratchet wheel 31 (which is shown as having eight teeth). The first or idle movement of the operating lever, in which the pawl slides over one tooth of the ratchet-wheel and drops into engagement with the next tooth, is limited by the extension of the lever abutting a stop lug 44 on the outside of the head of the casing. The movement of the lever in the reverse direction causes the pawl to turn the ratchet-wheel and the rotor inside the casing, and this movement is limited by the pin 43 striking an adjustable stop 45. This stop is preferably a screw threaded through a lug 46 on the casing, and locked by a nut 47. The adjustable stop is so set that when it arrests the forward or working movement of the lever the rotor port 26, 18 is always in definite registry with one of the casing ports 7.

A spring 48 is connected at its opposite ends to a pin 49 on the lever and another pin 50 on a bracket arm 51 projecting from the casing. This spring will assist the forward movement of the lever, or may effect that movement if the operator removes his hand from the knob 52 after moving the lever against the stop 44, but its important function is to insure that the lever will be brought and held against the stop 45, thereby insuring proper port registration for each position of the rotor.

A multi-position lock is provided between the rotor and the casing or other fixed part of the selector, and this lock is of such character as to be made effective by pressure on the fluid in the casing, so that while this pressure condition exists the lock can not be released and the rotor can not be turned from any of its port-registering positions. This prevents any possibility of the attendant turning the rotor when a valve is open, thereby trapping liquid in the line 8 and the servo-motor of this valve, with the result that the valve would be left open, after which another valve could be opened or partly opened. It is true that such liquid would not be entirely trapped, because of the provision of the groove 15 and the port 11, but the closing of the valve by virtue of displacement of liquid into the pipe 12 would be slow, or might not occur if the valve-closing spring were not particularly strong. Furthermore, the groove 15 and port 11 need not necessarily be present, and if they are used it would be disadvantageous for liquid displaced by the closing of the valve to be expelled into the pipe 12, since it should be returned to the piston chamber of the operator.

The form of this lock may be varied, but the construction which will now be described has been found especially advantageous. In the outer side of the plate 21 eight recesses 53 are made. These recesses have sloping sides to coact in a camming manner with balls 54 which project less than half of their diameter from cavities 55 in the inner side of the head of the casing. Four balls and four of these cavities are used for an eight-position selector, the four balls disposed at equal intervals about the axis eliminating any tendency of the rotor to cock when it is turned. The positions of the recesses 53 and of the balls 54 and cavities 55 are such that the balls are engaged by recesses 53 at each of the port-registering positions of the rotor.

The balls remain in the cavities 55, whereas the recesses 53 turn with the rotor, into and out of engagement with the balls. At the start of each turning movement of the rotor, the sloping sides coact in a camming manner with the balls, so that the rotor as a whole is forced away from the head of the casing until the flat outer surface of the plate 21 rides on the balls. At substantially the end of each limited turning movement, a new group of the recesses 53 engage over the balls and the rotor can return to a position adjacent the head of the casing.

By making the slope of the camming sides of the recesses 53 of a proper angle, turning of the rotor, even by great effort applied to the lever 34, is made impossible as long as the liquid in the selector casing is under operating pressure holding one of the valves open. This pressure acts upon the rotor pressing it against the balls, or against the head of the casing, and the rotor can not be cammed away from the casing head against the pressure by reaction between the balls and the sloping sides of the recesses. In my experiments I have found that the included angle of such sloping sides should not be greater than about 70°, or about 35° for the center angle, otherwise the camming action will take place too easily and the lock will not be sufficiently positive. However, variation in other conditions may affect the limiting angle, and the angularity referred to is given with that reservation.

From the foregoing it will be understood that the rotor of the selector is capable of moving bodily in the axial direction, from and toward the head of the casing. The shaft 14, lever 34 and the other parts connected with the external portion of the shaft preferably partake of this motion. A spring 56 interposed between the outside of the casing and a washer 57, which is backed by the ratchet-wheel 31, urges the rotor to or against the inside of the head of the rotor casing. This spring serves a useful purpose, since if the plate 21 should lie too far away from the fixed head 13 at a time when the liquid is not under pressure the balls 54 might become wedged when an attempt was made to turn the rotor.

The operation of the selector will now be reviewed. The rotor is turned always in one direction by the ratchet mechanism, each turning movement of the rotor being the angular distance between the centers of two adjacent peripheral ports 7. Let it be assumed that the index 38 points to numeral 1 on the dial 35, as in Fig. 1, showing that the rotor port 26, 18 is in registry with the port 7 of number 1 valve, and that it is desired to select number 2 valve for operation. The operator piston must be in its normal rearward position, so that the liquid in the selector is not under pressure, otherwise the rotor can not be turned. The attendant grasps the knob 52 and moves the lever 34 in the idle direction, which is clockwise in Fig. 1, a distance corresponding to one tooth of the ratchet-wheel 31, or somewhat more, whereupon further movement of the lever in this direction is arrested by the stop 44. In said movement the pawl 39 slips over the sloping side of a ratchet tooth and comes into engagement with the next tooth, and the index 38 comes opposite the numeral 2 on the dial. The attendant then moves the lever in the counter-clockwise direction, or permits this movement to take place under the action of the spring 48. This movement turns the rotor the distance between two neighboring distributing ports 7, and exact registration of the rotor and casing ports at this position, as at each and every position of the rotor, is insured by the action of the spring 48 bringing the lever against the stop 45. The rotor port is now in communication with the port 7 of number 2 valve, and the numeral 2 on the dial is still opposite the index 38, since the dial, being fixed to the rotor shaft, was moved in unison with the rotor and the lever 34. If the attendant should wish to select number 4 valve, let us say, he gives the lever 34 two more complete oscillations, or to select any other valve he oscillates the lever until the indicator shows him that he has brought the rotor port into registry with the proper port 7.

The commencement of each turning movement of the rotor is accompanied by a bodily movement of the rotor away from the head of the casing, due to the camming reaction between the balls 54 and the sloping sided recesses 53, and the conclusion of each turning movement is accompanied by a movement of the rotor toward the head, under the action of the spring 56, when a new group of the recesses 53 come into registry with the balls. These balls and recesses would also act as positioners for the rotor if there should be any tendency of the rotor to be turned too far by a very impulsive operation, which, however, is unlikely because of the friction between the cup-leather 16 and the casing. Furthermore, the pressure of the pawl 39 on the ratchet wheel would serve to restrain overthrow movement of the rotor. The principal function of the projecting balls and the recesses is to prevent the rotor being turned from one position to another when the liquid in the system is under pressure. This pressure acts to hold the rotor forcibly against the head of the casing, or against the balls, so that the component of force that can be produced in the opposite direction by an attempt to turn the rotor will not overcome the fluid pressure.

While the preferred embodiment of the invention has been described with particularity, it will be understood that numerous changes may be made in the form and arrangement, and in details, without departing from the scope of the invention defined in the claims. The claims are intended to cover all the generic and specific features of the invention, and all definitions of the scope of the invention which as a matter of language might be said to fall therebetween.

I claim:

1. A selector comprising a fixed, enclosed casing having a peripheral wall containing a multiplicity of ports in circular series and a head wall provided with a central opening, an operating shaft passing through said opening, and a hollow rotor connected to said shaft, said rotor comprising a cupped body and a cup-leather secured with said body to turn therewith in close contact with the inside of the casing, said cup-leather having a single port in its skirt to register with any of the peripheral casing ports and the annular part of the rotor body likewise having a single port.

2. A selector comprising a fixed, enclosed casing having a peripheral wall containing a multiplicity of ports in circular series and a head wall provided with a central opening, an operating shaft passing through said opening, and a hollow rotor connected to said shaft, said rotor comprising a rigid part and a cup-leather secured with said rigid part, the skirt of the cup-leather cooperating in a fluid-tight manner with the inner surface of the peripheral wall of the casing and the back of the cup-leather being interposed between said rigid part and the inner surface of the head wall to form another fluid-tight contact, the skirt of the cup-leather having a single port to register with any of the peripheral casing ports.

3. A selector comprising a fixed enclosed casing having a peripheral wall containing a multiplicity of ports in circular series and a head wall provided with a central opening, an operating shaft passing through said opening, and a hollow rotor connected to said shaft, said rotor comprising a ported cup-leather, a cupped body inside the cup-leather, and a plate outside the cup-leather, between which body and plate the back of the cup-leather is clamped, leaving the skirt of the cup-leather free.

4. A selector comprising a fixed, enclosed casing having a peripheral wall containing a multiplicity of ports in circular series, an operating shaft, a hollow rotor connected to said shaft, said rotor comprising a ported cup-leather, a plate outside the cup-leather, and means associated with said plate for locking the rotor in positions corresponding to the positions of the peripheral ports.

5. A selector comprising a fixed, enclosed casing having a peripheral wall containing a multiplicity of ports in circular series, an operating shaft, a hollow rotor connected to said shaft, said rotor comprising a ported cup-leather, a plate outside the cup-leather, means associated with said plate for locking the rotor in positions corresponding to the positions of the peripheral ports, and a connection passing through the back of the cup-leather to secure the cup-leather, the body and the locking plate in definite relation.

6. A selector comprising a fixed, enclosed casing having a peripheral wall containing a multiplicity of ports in circular series, and a hollow rotor comprising a ported cup-leather, a ported body inside said cup-leather, and springs interposed between the periphery of said body and the skirt of the cup-leather.

7. A selector comprising a fixed enclosed casing having a peripheral wall containing a multiplicity of ports in circular series, and a hollow rotor comprising a ported cup-leather, a ported and externally grooved body inside said cup-leather, and helical springs disposed circularly in the grooves of said body and pressing the skirt of the cup-leather uniformly against the inside of the ported peripheral wall of the casing.

8. A selector comprising a casing having a multi-ported peripheral wall, a ported rotor which is capable of movement from and toward the head of the casing, a shaft and handle for turning the rotor, and a multi-position lock between the rotor and the casing, said lock being held against release by pressure of fluid on the rotor.

9. A selector comprising a casing having a multi-ported peripheral wall and a head wall having a central opening, an operating shaft passing through said opening, a handle connected with the external part of the shaft, a ported rotor connected with the internal part of the shaft, and a multi-position lock between the rotor and the head wall, said rotor being movable away from the head wall to release the lock when fluid pressure on the rotor is relieved.

10. A selector comprising a casing having a multi-ported peripheral wall and a head wall having a central opening, an operating shaft passing through said opening and capable of longitudinal movement therein, a handle connected with the external part of the shaft, a ported rotor connected with the internal part of the shaft and capable of movement from and toward said head wall, and elements between the rotor and the head wall cooperative at each port-registering position of the rotor to produce a complete locking of the rotor under pressure of fluid in the casing.

11. A selector comprising an enclosed casing having a head wall and a multi-ported peripheral wall, a ported rotor in the casing capable of movement from and toward the head of the casing and adapted to be pressed toward the head by fluid pressure in the casing, and an automatic multi-position lock between the head of the casing and the back of the rotor, said lock comprising rounded projections from the one cooperative with camming recesses in the other.

12. A selector comprising an enclosed casing having a head wall and a multi-ported peripheral wall, a ported rotor in the casing capable of movement from and toward the head of the casing and adapted to be pressed toward the head by fluid pressure in the casing, and an automatic multi-position lock between the head of the casing and the back of the rotor, said lock comprising balls occupying cavities in the one and cooperative camming recesses in the other.

13. A selector comprising an enclosed casing having a head wall and a multi-ported peripheral wall, a ported rotor in the casing capable of movement from and toward the head of the casing and adapted to be pressed toward the head by fluid pressure in the casing, and an automatic multi-position lock between the head of the casing and the back of the rotor, said lock comprising balls occupying cavities in the one and cooperative camming recesses in the other, the sides of said camming recesses being formed at approximately a 35° center angle.

14. A selector comprising an enclosed casing having a head wall and a multi-ported peripheral wall, a ported rotor in the casing capable of movement from and toward the head of the casing and adapted to be pressed toward the head by fluid pressure in the casing, an automatic multi-position lock between the head of the casing and the back of the rotor, said lock comprising rounded projections from the one cooperative with camming recesses in the other, and a spring serving to keep the back of the rotor in proper proximity to the head of the casing.

15. A selector comprising a casing having a peripheral wall provided with a series of equally spaced ports and an extra orifice, an operating shaft passing through the head of the casing, a rotor in the casing composed of rigid parts and a cup-leather held thereby, the skirt of said cup-leather having a port to register with any of the peripheral ports and also having a circumferential groove which does not communicate with said port and which does communicate with all but one of the peripheral ports and with said extra orifice.

PAUL S. SHIELD.